United States Patent [19]
Barnes et al.

[11] Patent Number: 5,295,010
[45] Date of Patent: Mar. 15, 1994

[54] AMPLIFYING AND SYNCHRONIZING SIGNALS IN OPTICAL COMPUTING SYSTEM

[75] Inventors: Frank S. Barnes, Boulder; Harry F. Jordan, Jamestown, both of Colo.

[73] Assignee: The Regents of the University of Colorado, Boulder, Colo.

[21] Appl. No.: 955,812

[22] Filed: Oct. 2, 1992

[51] Int. Cl.⁵ .......................... G02F 3/00; G02B 6/26; G02B 6/28
[52] U.S. Cl. ...................................... 359/107; 359/20; 359/108; 359/330; 364/713; 385/24; 385/122
[58] Field of Search ................. 359/20, 107, 108, 328, 359/330, 332; 372/8, 18; 385/16, 24, 122; 364/232.5, 713

[56] References Cited

U.S. PATENT DOCUMENTS

| | | | |
|---|---|---|---|
| 4,180,751 | 12/1979 | Ammann . | |
| 4,382,660 | 5/1983 | Pratt, Jr. et al. | 372/18 |
| 4,405,869 | 9/1983 | May . | |
| 4,856,862 | 8/1989 | Passmore et al. | 385/24 |
| 4,880,996 | 11/1989 | Peterson et al. . | |
| 4,900,115 | 2/1990 | Heuring et al. . | |
| 5,073,981 | 12/1991 | Giles et al. | 372/8 |
| 5,082,340 | 1/1992 | Aoshima et al. | 359/332 |
| 5,109,462 | 4/1992 | Watanabe et al. | 359/332 |
| 5,111,466 | 5/1992 | Normandin et al. | 359/328 |
| 5,144,375 | 9/1992 | Gabriel et al. | 385/16 |

Primary Examiner—Martin Lerner
Attorney, Agent, or Firm—Homer L. Knearl; Earl C. Hancock

[57] ABSTRACT

Amplification and synchronization of photon pulses in optical computing chips is accomplished by placing parametric amplifying devices at predetermined spatial locations in the light conductive paths that make up the optical circuits in the chip. The laser pumping signal for the parametric amplifiers is clocked by a system clock which also clocks the generation of the data photon pulses in the optical circuits. By synchronizing the arrival of a pumping pulse with the arrival of the photon pulse at a parametric amplifier, the data pulse can be amplified, reshaped and resynchronized. The pumping pulse can be directed to the spatially located parametric amplifiers on the chip in a number of different ways. The chip could be masked except for the parametric amplifiers, and the entire chip could be illuminated by the pumping laser though collimating lens. If the chip is not masked, then pumping light must be directed only to the parametric amplifiers. This could be done with a hologram to spatially distribute the light beams to the amplifiers. Alternatively, the beam from the pumping laser could be piped by light conducting fibers to the parametric amplifiers with light pipes. Further, the light pipes for the pumping pulses could be light conducting channels in a second optical chip, or an additional optical circuit layer.

20 Claims, 5 Drawing Sheets

AMPLIFYING AND SYNCHRONIZING SIGNALS IN OPTICAL COMPUTING SYSTEM

BACKGROUND OF THE INVENTION

1. Field of the Invention

This invention is directed to an optical computing system. More particularly, it is directed to the manipulation of photon signals as they pass through the optical computing system, and optical computing chips in that system.

2. Description of Prior Art

An important problem in the operation of an optical computing chip in a high speed optical computing system is the distribution of a clock pulse signal in space and time so that the clock can be used to synchronize various logical operations in the chip with the photon signals passing through the chip. The problem is particularly difficult, as the width of photon signal pulses shortens to a picosecond and even sub-picoseconds. Further, such a pulse at any given instant occupies only a few microns of space as it travels through the computing chip. Therefore, if two or more photon pulses are to interact, they must arrive at the correct spatial position within microns and at the correct time within sub-picoseconds.

A secondary problem in the operation of an optical computing chip is the loss of signal amplitude, or the loss of pulse signal shape (narrower or wider) as the photon pulse passes along the light conducting paths of the chip. Typically, logic devices in an optical computing chip are passive devices and do not amplify the photon signals. Further, a photon pulse that is deteriorating may be further clipped in duration, or amplitude, by the optical logic devices.

The prior art contains examples of optical logic devices, optical computing chips, and optical parametric amplifiers. U.S. Pat. No. 4,405,869, issued to George A. May et al, is a good example of an optical logic device that can be configured as "AND" or "OR" logical gate. U.S. Pat. No. 4,900,115, issued to Vincent P. Heuring et al, describes optical modules, or chips, containing multiple optical logic devices. U.S. Pat. No. 4,180,751, issued to Eugene O. Ammann, and U.S. Pat. No. 4,880,996, issued to Phillip R. Peterson et al, are examples of parametric amplifying devices. The prior art does not address the problem of system distribution of clock pulse signals in space and time in an optical computing system. Further, the prior art does not address the problem of time and spatial deterioration of photon pulse signals in optical chips in an optical computing system.

SUMMARY OF THE INVENTION

It is an object of this invention to improve the processing of data pulses in optical computing modules.

In accordance with this invention, the above object has been accomplished by splitting the synchronization or amplification function from the logical operative functions in optical computing chips or modules. The synchronization is accomplished by placing parametric amplifying devices in the chip at predetermined spatial locations in the light conductive paths, or waveguides, that make up the optical circuits. In addition, the laser pumping signal for the parametric amplifiers is clocked ON/OFF by a reference clock signal for the computing system. The system clock signal also clocks the generation of the data laser pulse signals in the optical circuits. The length of the path for the data pulses is known since the optical paths are known. Therefore, the time and spatial relationship on the chip of a data pulse can be determined. Laser pump pulses, created by turning the pumping laser ON/OFF, are directed to the parametric amplifiers. By coordinating the arrival of a laser pump pulse with the arrival of the data pulse at the parametric amplifier, the data pulse can be amplified or dissipated. The dissipation, or attenuation, of a data pulse is due to losses in the optical circuit path. The result of amplifying, or attenuating, portions of the data pulses based on synchronization with the pump pulses is the reshaping and resynchronizing of the data pulse at the parametric amplifiers on the chip. The amplification, or attenuation, of a data pulse can also be used to select pulses.

The pump laser pulse can be directed to the spatially located parametric amplifiers on the chip in a number of different ways. The chip could be masked, except for the parametric amplifiers, and then the entire chip could be illuminated by the pumping laser through collimating lens. If the chip is not masked, then pumping light must be directed only to the parametric amplifiers. This could be done with a hologram to spatially distribute the light beams to the amplifiers. Alternatively, the beam from the pumping laser could be piped by light conducting fibers to the parametric amplifiers with light pipes. Further, the light pipes could be light conducting channels in the optical chip or module.

Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 1A:
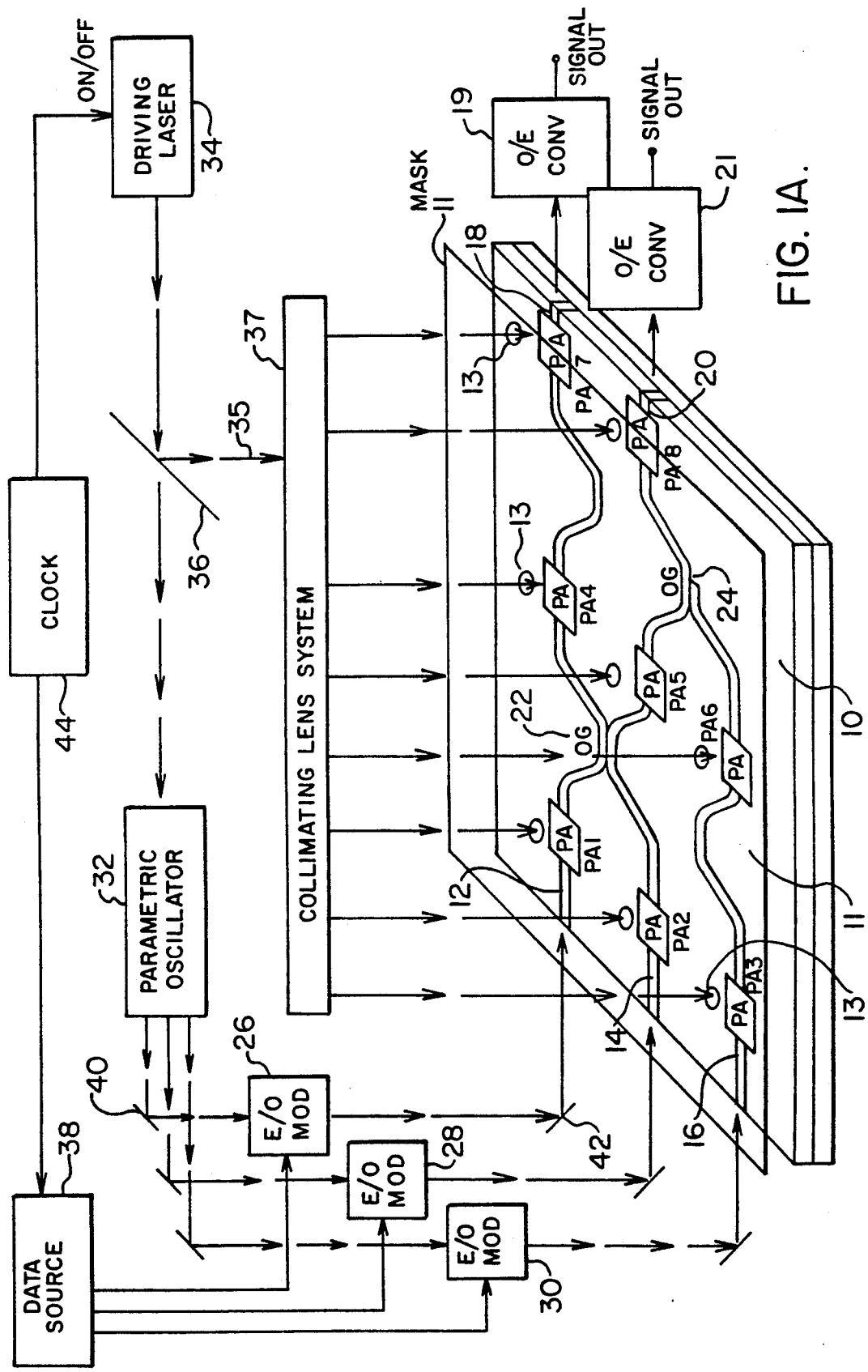
FIG. 1A shows an optical computing chip having parametric amplifying stages at predetermined locations in the optical circuit path, and illuminated by a pumping laser turned on/off in synchronism with the data signals.

The preferred embodiment of the invention, schematically illustrated in FIG. 1, has a simple optical computing chip 10 with three data photon input paths 12, 14 and 16, and two output paths 18 and 20. In the optical circuit on the chip, there are two optical logic gates 22 and 24, and eight parametric amplifiers PA1-PA8. The logic functions of the optical gates may be AND, OR, INVert, etc. The logic gates are spatially located in the light conducting paths through the chip so that photon pulses, which interact at the logic gates, will arrive at the gates simultaneously. The output photon data pulses from outputs 18 and 20 are converted back to electrical signals by optical/electrical converters 19 and 21.

The data photon pulses at the inputs 12, 14 and 16 are created by electro-optical modulators 26, 28 and 30 respectively. The optical beam that is modulated into pulses is produced by the parametric oscillator 32. Oscillator 32 is driven by pumping laser 34. The beam from pumping laser 34 is split by beam splitter 36 into a first beam that pumps the parametric oscillator 32, and a second beam which pumps the parametric amplifiers PA1-PA8 on the chip 10. The frequency $f_P$ of the pumping laser 34 is higher than the signal frequency $f_S$ of the coherent beam produced by the parametric oscillator; typically, $f_P = 2f_S$. With such a frequency difference, the pumping laser beam may be easily filtered, or separated, from the signal laser beam in the parametric amplifiers PA1-PA8.

The pumping laser beam 35 is directed to the chip by a collimating lens system 37. The collimating lens spreads the pumping laser beam 37 so that the beam floods the entire chip 10. However, mask 11 has apertures 13 that pass the pump laser beam only to the parametric amplifiers PA1-PA8.

Figure 1B:
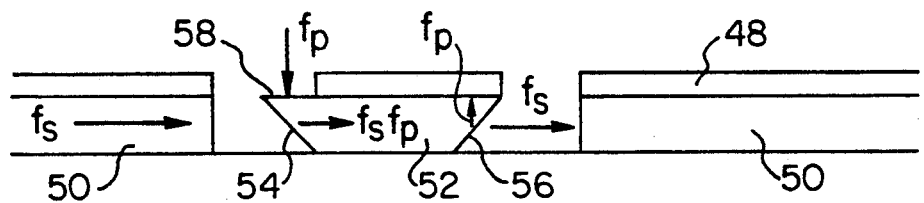
FIG. 1B is a detailed illustration of one embodiment of the parametric amplifiers using reflective interfaces.

FIG. 1B shows the preferred embodiment for a parametric amplifier and mask in an optical computing chip 10. Chip 10 is made up of a substrate 46 of Lithium Niobate ($LiNbO_3$). Light conducting paths, or waveguides, 50 are Titanium or Hydrogen doped Lithium Niobate. Alternatively, the computing chip with light conducting paths may be fabricated with Aluminum Gallium Arsenide and Gallium Arsenide.

Layer 48 is a reflective metal layer for masking the pumping pulses from the path, and for forming the top reflective surface of the light conducting path. The data photon pulse contains light at the signal frequency $f_S$ and is traveling along light conducting path or waveguide 50. The parametric amplifier is portion 52 of the waveguide; the boundaries of the amplifier are defined by the surface interfaces 54 and 56. These air/waveguide interfaces 54 and 56 are cut at the Brewster angle for light at frequency $f_S$. Accordingly, light $f_S$ is transmitted through the interfaces 54 and 56, while light at the pumping laser frequency $f_P$ is totally reflected at interfaces 54 and 56. Thus, light $f_S$ is introduced into the amplifier 52 at interface 54, and is extracted from the amplifier at interface 56. In the amplifier region 52, light $f_S$ and $f_P$ interact in the well known manner so that light $f_S$ is pumped, or amplified, by light $f_P$. Mask 48 has an opening 58 so that light f may enter amplifier 52. Mask 48 covers the exit of the light $f_P$ above interface 56 so as to dissipate the exiting pumping laser beam and prevent it from getting back to the pumping laser 34. Mask 48, just like mask 11 in FIG. 1A, covers the optical path except where there is a parametric amplifier so as to prevent the pumping pulses $f_P$ from interacting with the data pulses $f_S$ except at the amplifier 52.

Figure 1C:
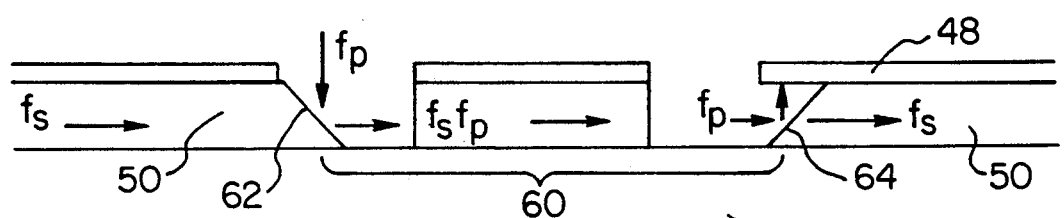
FIG. 1C is a detailed illustration of an alternative embodiment for the parametric amplifier in FIG. 1B.

FIG. 1C is an alternative embodiment for the parametric amplifiers PA1-PA8 in FIG. 1A. Just as in the embodiment of FIG. 1B, chip 10 has a substrate 46, a mask 48 and waveguide 50 for the data photon pulse made up of light at signal frequency $f_S$. The parametric amplifier 60 is bounded by air/waveguide interfaces 62 and 64 which pass light at frequency $f_S$, and totally reflect light at frequency $f_P$. These $f_P$ reflective interfaces can be accomplished by cutting the interfaces 62 and 64 at the Brewster Angle for light $f_S$, or by coating the interfaces with a coating to pass $f_S$ and reflect $f_P$. Inside the amplifying region 60, $f_S$ and $f_P$ interact so that $f_S$ is amplified. At interface 64, $f_P$ is separated or filtered out and dissipated in mask 48. One advantage of the embodiment in FIG. 1C is that the interfaces 62 and 64 do not undercut the waveguide material as they do in FIG. 1B. Thus, this embodiment may be easier to manufacture.

Figure 1D:
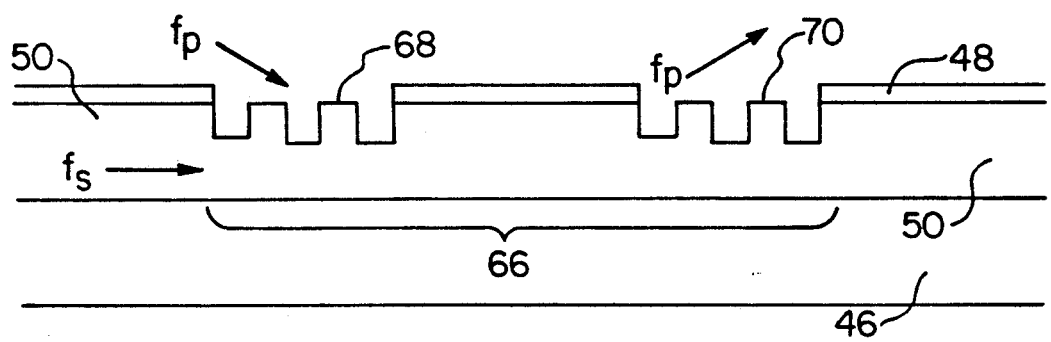
FIG. 1D is a detailed illustration of another embodiment for the parametric amplifiers using optical gratings.

FIG. 1D illustrates a third alternative for the parametric amplifiers PA1-PA8 that uses interference gratings to introduce the laser pumping light $f_P$, and filter out, or extract, the light $f_P$ after the amplification of $f_S$. Chip 10 comprises a substrate 46, mask 48 and waveguide 50. The parametric amplifier 66 is bounded by interference gratings 68 and 70. These gratings are created by cutting air channels across the waveguide 50. The channels cut in the waveguide create an interference grating which may be used at grating 68 to introduce $f_P$ pumping light into the waveguide in the pumping region 66. Grating 70 acts to extract, or filter, the $f_P$ light out of the waveguide at the end of pumping region 66.

In FIG. 1A, the electrical data signals that control the modulators 26, 28 and 30 come from the data source 38. In operation, a beam of coherent light, at frequency $f_S$ from oscillator 32, is reflected by mirror 40 to modulator 26. In response to the data source 38, modulator 26 passes, or blocks, the beam from mirror 40. When a data photon pulse is to be applied at the input 12 of chip 12, the modulator 26 passes a pulse of light that is reflected by mirror 42 into input 12. Similarly, modulators 28 and 30, in response to the data source, convert a coherent beam from oscillator 32 into a photon pulse containing light at frequency $f_S$, and this pulse is applied to inputs 14 and 16 of chip 10.

Clock 44 provides the system clock signal for the data pulses, and also provides the ON/OFF signal to the driving laser 34. Therefore, the generation of the photon data pulses by modulators 26, 28 and 30 is synchronized with the generation of pumping pulses by laser 34. The optical path length from the modulators 26, 28 and 30 to the spatially located amplifiers PA1, PA2 and PA3 is such that the arrival of the data photon pulse at an amplifier will be synchronized with arrival with a pulse light at frequency $f_P$ of pumping laser beam 35 from laser Accordingly, clock 44 is set to switch laser 34 ON/OFF to generate a pumping pulse of light $f_P$. Also, the distance of the optical path from laser 34 to the spatially located amplifiers PA1-PA8 must be such that the pumping pulse is present at each amplifier at the same time as the data photon pulse.

Figure 2:
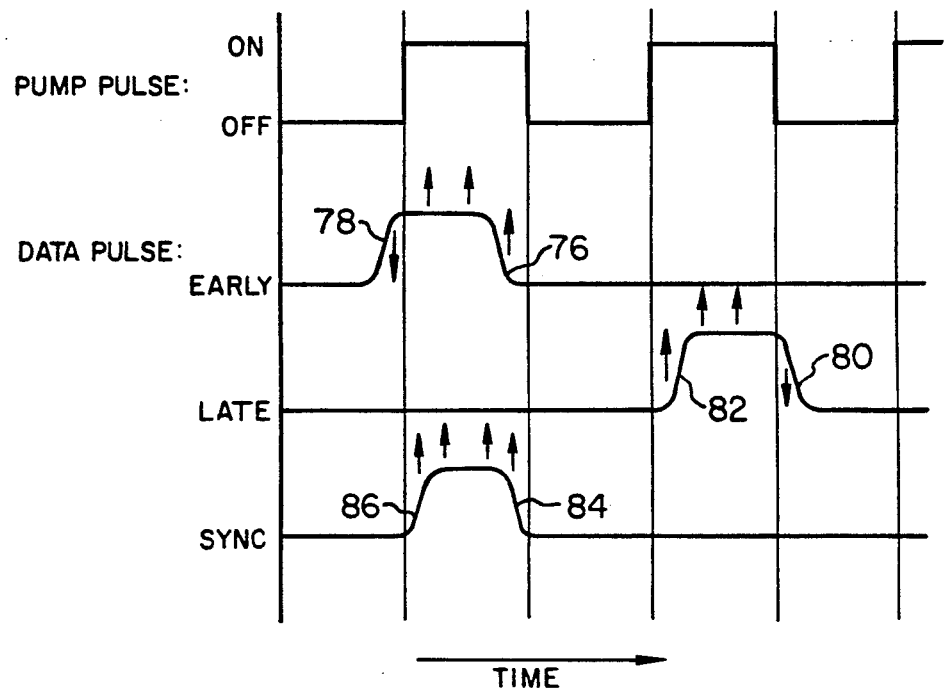
FIG. 2 is a timing diagram illustrating the effect of overlapping the pumping laser pulses with the data photon pulses in amplifying, reshaping and resynchronizing the data photon pulse.

In FIG. 2, the timing of the pumping pulse and data photon pulses is illustrated for an early, late and synchronized data pulse. Since the laser 34 may be turned ON or OFF in fractions of a picosecond, the edges of the pump pulse rise, or fall, in intervals on the order of $10^{-13}$ seconds. This is fast enough to accomplish the desired reshaping and resynchronization of the data photon pulses which also have rise and fall times in the order of $10^{-13}$ seconds. Arrows in FIG. 2 indicate amplification if up, and attenuation if down. The amount of attenuation depends on light losses inherent in waveguide and the parametric amplifier. The amount of loss can be adjusted by changing the dimensions of waveguide, or amplifier, or by changing the reflectivity and transmissivity of air/waveguide interfaces that define the amplification region.

In the case of an early data pulse, the pumping pulse tends to amplify the leading edge 76, and attenuate the trailing edge 78 of the pulse while amplifying the main body of the pulse. A late data pulse, in addition to being amplified, has its leading edge 80 attenuated, and its trailing edge 82 amplified. A data pulse that is in sync with the pumping pulse has both the leading edge 84 an trailing edge 86 amplified, as well as the main body of the pulse being amplified. Accordingly, to the extent the data pulse and the pumping pulse have portions that overlap, those portions of the data pulse are amplified. Portions of the data pulse that do not overlap the pumping pulse are reduced in amplitude due to dissipation in the light conducting paths. As a result, the parametric amplifiers, when pulsed with pumping light, not only amplify the data photon pulse but also tend to restore its shape and resynchronize it relative to the pump pulses and, thus, relative to other data pulses.

Figure 3:
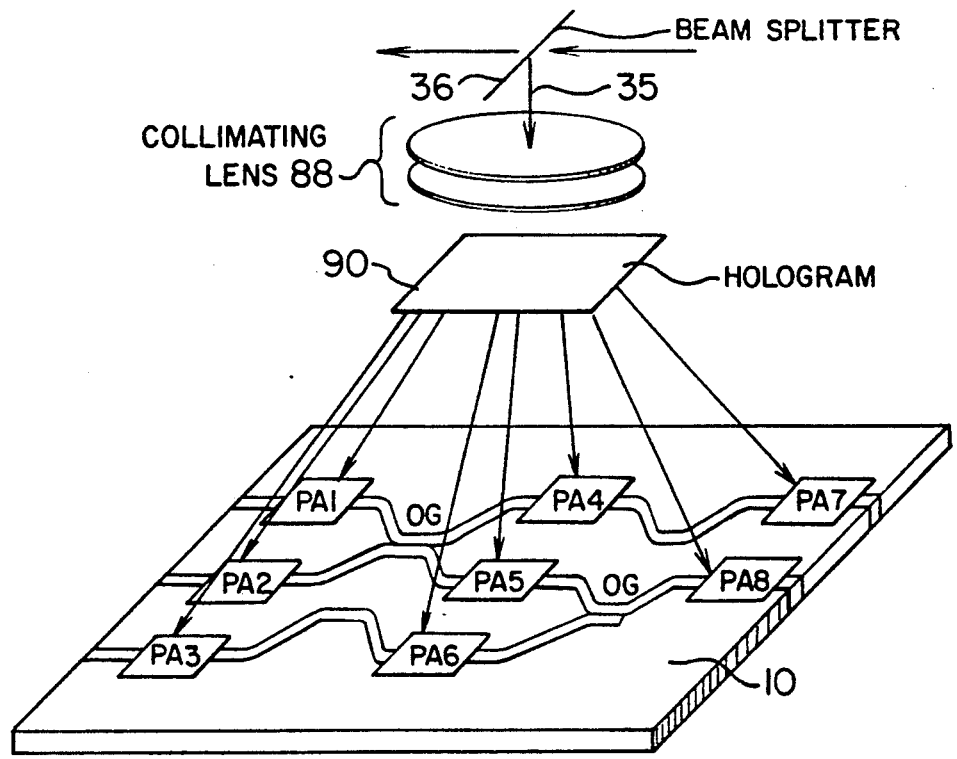
FIG. 3 shows the pumped laser beam being directed by a hologram onto the parametric amplifiers in the optical computing chip.

FIG. 3 is an alternative embodiment for the optics that deliver the pump pulse to the parametric amplifiers PA1–PA8. The pumping laser beam 35 is spread into a slightly wider beam by collimating lens 88. This spreads the beam sufficiently to illuminate the surface of hologram 90, and the hologram spatially distributes the pump pulse beam to each of the parametric amplifiers PA1–PA8. In effect, the hologram converts the pulsed laser beam from one beam to eight beams, with each of the eight beams directed to a parametric amplifier. In this embodiment, the chip 10 does not require a mask 11 (FIG. 1A), or mask layer 48 (FIGS. 1B, 1C, 1D), as the pump pulse only illuminates the parametric amplifiers.

Figure 4:
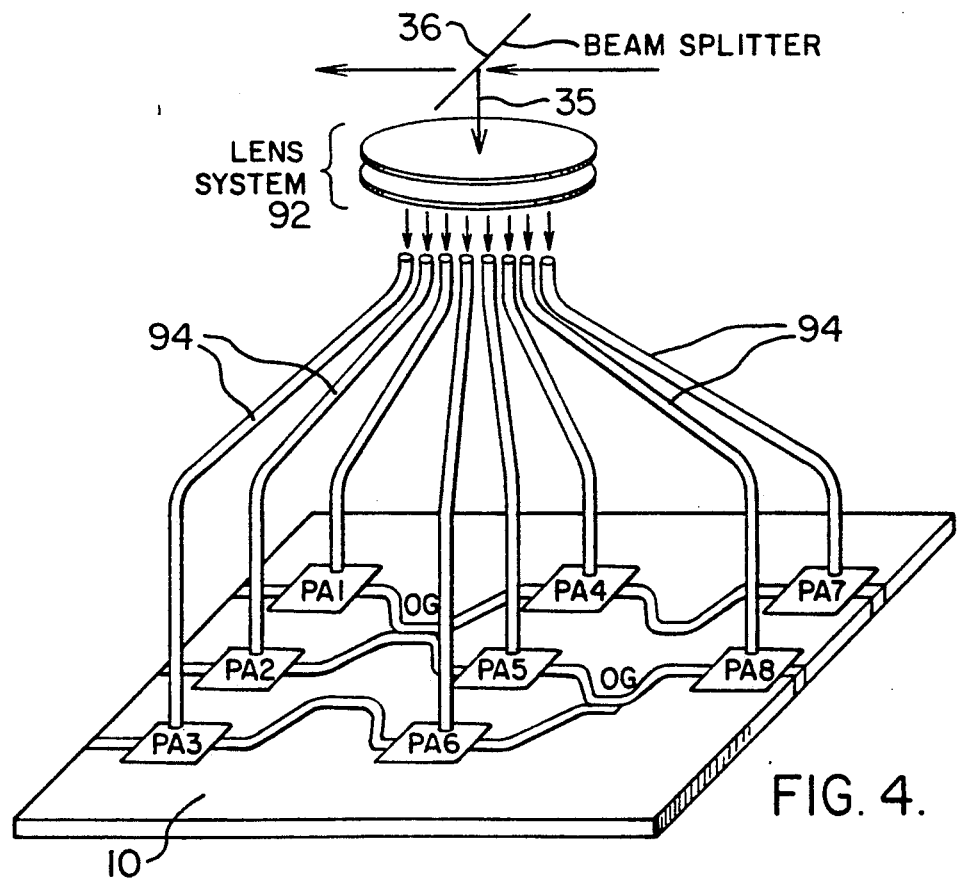
FIG. 4 shows the pumped laser beam being focussed onto the end of a bundle of optical fibers whereby the optical fibers conduct the pumped laser beam to the parametric amplifiers in the computing chip.

FIG. 4 is another alternative embodiment for illuminating the parametric amplifiers. The pump pulse laser beam 35 is directed by lens system 92 onto the end of a bundle of optical fibers 94. In FIG. 4, the bundled ends of the fibers are in line, but the bundle could be any convenient configuration. Each fiber 94 conducts the pump laser pulse to it's associated parametric amplifier. The fibers 94 must be equal in length, or any difference in length must be a multiple of the distance travelled by the pump pulse in one ON/OFF cycle of laser 34 (FIG. 1A). In other words, the pump pulses emitted at the end of fibers 94, adjacent the amplifiers PA1–PA8, should be synchronized. Further, as discussed above, the overall path from laser 34 to the amplifiers must be a distance such that the pump pulse at each amplifier arrives at the same time as a synchronized data photon pulse.

Figure 5:
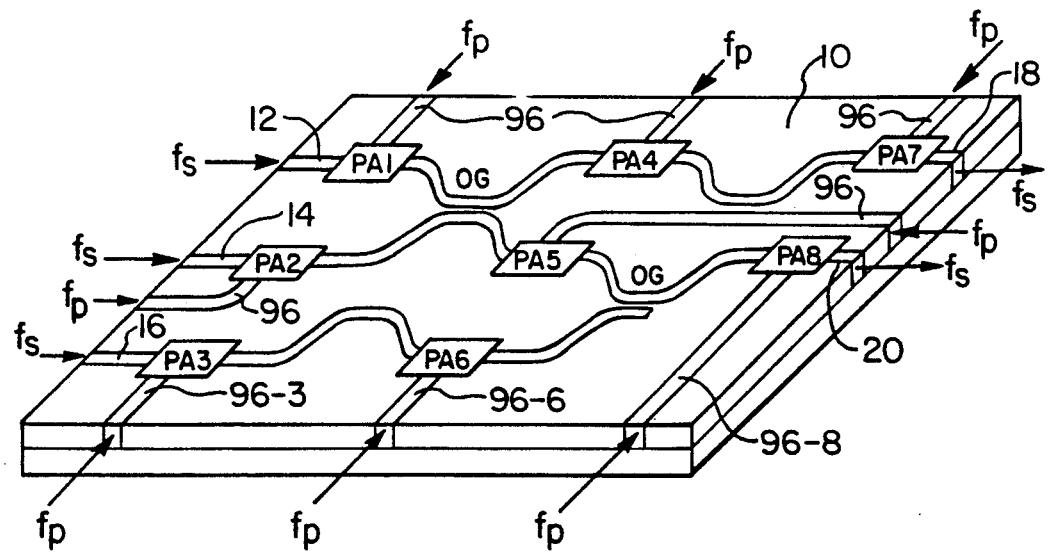
FIG. 5 shows an optical computing chip where the light conducting path for the pumping laser beam is integrated into the same layer in the chip as the amplifiers.

In FIG. 5, an alternative design for chip 10 illustrates a technique for delivering both data photon pulses, at light frequency $f_S$, and pump pulses at light frequency $f_P$. In this embodiment of the chip, the pump pulses $f_P$ are applied at the edge of the chip 10. The layer of the chip containing the optical circuit paths 50 also has optical paths 96 for the pump pulses. For example, paths 96-3, 96-6 and 96-8 conduct laser pump pulses to parametric amplifiers PA3, PA6 and PA8, respectively. In FIG. 5, each pump pulse path 96 has a pump pulse beam $f_P$ at its entrance. The input circuit paths 12, 14, 16 and output circuit paths 18, 20 are the same as in FIG. 1A. The delivery of the pump pulse beams to the pump path entrances at the edge of chip 10 would be accomplished preferably with light conducting fibers, as shown in FIG. 4.

Figure 6:
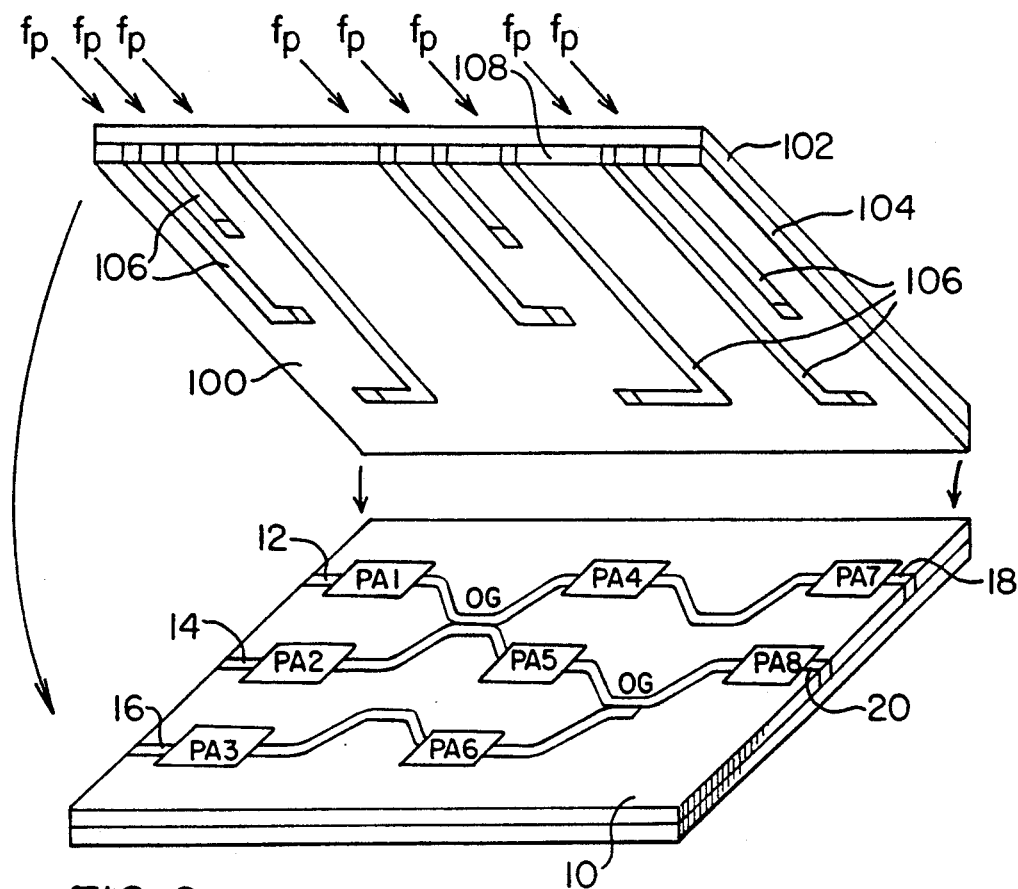
FIG. 6 shows an optical computing chip where the light conducting path for the pumping light is in an illumination chip separate from the optical circuit chip, and the illumination chip may be held adjacent to or bonded to the optical circuit chip.

In FIG. 6, optical circuit chip 10 is overlaid by a pump pulse illumination chip 100 (shown rotated away from chip 10). Chip 100 is made up of a substrate 102 and illumination layer 104. In the illumination layer 104, light conducting paths 106 guide the laser pump pulses to an emission point juxtaposed with the amplifiers PA1–PA8. The end of each path 106 will be cut at angle, and have a reflective coating to reflect the pumping laser pulse to its parametric amplifier.

Chips 10 and 100 may be constructed so as to be clamped together, or bonded together, Chips 10 and 100 are aligned so that the end of each path, or waveguide, 106 is positioned over its associated parametric amplifier PA1–PA8 in chip 10. Just as in the other embodiments, the length of the pump pulse paths 106 is such that pump pulse nominally arrives at the amplifier at the same time as a data pulse. The laser pump pulses $f_P$ would preferably be delivered to edge 108 of chip 100 at the entrances to the light conducting paths, or waveguides, by optical fibers, as shown in FIG. 4. The total optical path length from laser 34 (FIG. 1A) to each parametric amplifier PA1–PA8 is preferably the same, or any differences must be equal to the distance that the light traverses during one or more complete ON/OFF cycles of laser 34.

Figure 7:
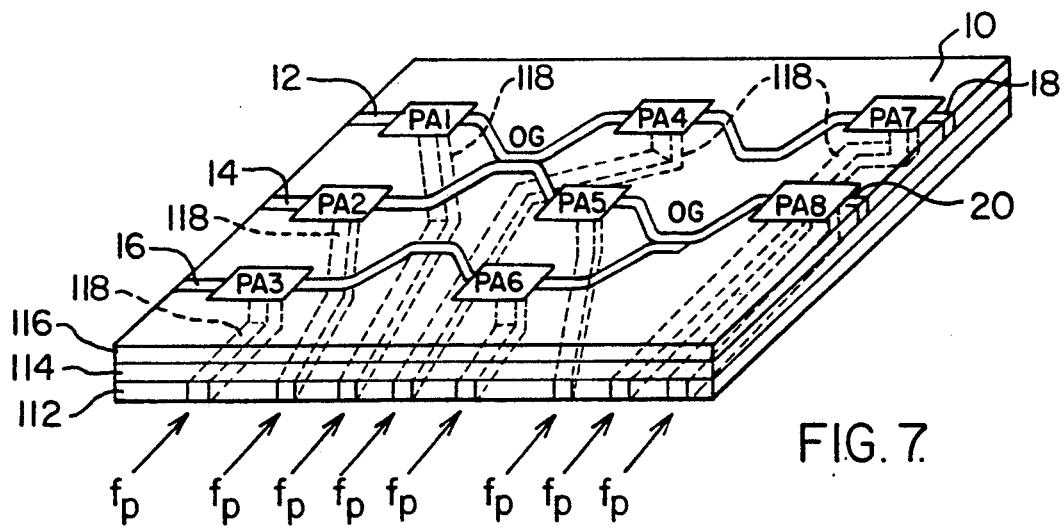
FIG. 7 shows an integrated illumination and optical computing chip where the optical circuit paths are on one side of a substrate layer and the illumination paths are on the other side of the substrate layer.

Another embodiment of chip 10 in FIG. 7 adds an illumination layer, or pump pulse path layer, 112 on the opposite side of the substrate 114 from the optical circuit layer 116. The pump laser pulses at pumping light frequency $f_P$ are applied at the entrances (indicated by light beams $f_P$) to light conducting paths 118 in the layer 112. Paths 118 conduct the pump pulses to an emission point juxtaposed with each parametric amplifier. The end of the path, or emission point, adjacent the amplifier has a reflective surfaces to reflect the pump pulse beam upward through the substrate to the parametric amplifier.

In addition to the embodiments shown in the drawings, the pumping laser may also be placed on the chip, or module, with the pumping pulse light conducting paths to the parametric amplifiers. Also, multiple, synchronized, pumping lasers could be placed on the chip; each pumping laser would be in juxtaposition to one or more parametric amplifiers. Further, while the preferred embodiments have described the light conducting paths for the pump pulses as being of a length that the pump pulses reach all of the amplifiers at the same time, it will be appreciated by one skilled in the art that this is not required. The pump pulses could arrive at different amplifiers at different times. However, the pump pulse and the data photon pulse must arrive at a given amplifier at substantially the same time, and the pump pulse path and the data photon pulse path may be adjusted in length to accomplish this objective.

While a number of preferred embodiments of the invention have been shown and described, it will be appreciated by one skilled in the art, that a number of further variations or modifications may be made without departing from the spirit and scope of our invention.

What is claimed is:

1. An optical computing apparatus for performing logical operations on data photon pulses in precise spatial/time dimensions, said apparatus comprising:
   an optical computing chip having light conducting paths for the data pulses;
   logic means in said paths for logically operating on one or more data pulses;
   amplifying means other than said logic means in said paths for amplifying data pulses with pumping light pulses;
   source means for providing synchronized data and pumping light pulses, said data pulses being directed to said paths and said pumping light pulses being directed to said amplifying means and not to said logic means;
   said logic means being spatially located within said paths and relative to said source so that interacting data pulses arrive at said logic means in synchronism; and
   said amplifying means being spatially located within said paths and relative to said source so that data pulses to be amplified arrive at said amplifying means in synchronism with said pumping light pulses.

2. The apparatus of claim 1 wherein said source means comprises:
   data source means for generating data photon pulses for said paths;
   pumping means for generating pumping light pulses;
   directing means for directing the pumping light pulses to said amplifying means and not to said logic means; and
   clocking means connected to both said data source means and said pumping means for synchronizing the generation of the data photon pulses and the generation of the pumping light pulses.

3. The apparatus of claim 2 wherein said directing means comprises:
   collimating means for collimating the pumping light pulses from said pumping means into a beam to distribute the light over the surface of said optical chip; and
   masking means for blocking the collimated beam for reaching the surface of said chip except where said amplifying means are spatially located on said chip.

4. The apparatus of claim 2 wherein said directing means comprises:
   collimating means for collimating the pumping light pulses from said pumping means into a beam; and
   holographic lens means responsive to said collimated beam for spatially distributing the collimated beam of light on to said amplifying means.

5. The apparatus of claim 2 wherein said directing means comprises:
   light conducting means for conducting the beam of pumping light pulses to each of said amplifying means; and
   said light conducting means having a path length to each of said amplifying means such that the pumping light pulses arrive at said amplifying means in synchronism with data photon pulses.

6. The apparatus of claim 5 wherein said light conducting means comprises:
   an illumination chip having light conducting paths for the pumping light pulses; and
   said illumination chip being placed adjacent to said optical computing chip with the pumping light path ends aligned with said amplifying means.

7. The apparatus of claim 5 wherein said light conducting means comprises:
   an illumination layer in said optical ship having light conducting paths for the pumping light pulses; and
   said illumination layer having the pumping light path ends aligned with said amplifying means.

8. The apparatus of claim 1 wherein said amplifying means comprises:
   means in said paths for introducing the pumping light pulses into the photon path for increasing the strength of said photon pulses by interaction with the pumping light pulses; and
   means in said paths for extracting the pumping light pulses from the photon path after interaction between the pumping light pulses and the photon pulses.

9. The apparatus of claim 8 wherein each of said introducing means and extracting means are reflective optical interfaces for the pumping light pulses and transmissive optical interfaces for the data photon pulses.

10. The apparatus of claim 8 wherein each of said introducing means and extracting means are optical gratings that are operative only with the pumping light pulses.

11. The apparatus of claim 1 and in addition:
    said light conducting paths dissipate the energy in said data photon pulses whereby data photon pulse portions that do not time overlap pumping light pulses at said amplifying means are reduced in amplitude and data photon pulse portions that do time overlap said pumping light pulses at said amplifying means are amplified so that the data photon pulses are reshaped and resynchronized as well as amplified.

12. Optical computing apparatus having optical circuits for logical operations on data laser pulses containing light at signal frequency $f_S$, said apparatus comprising:
    a computing chip having light conducting paths and logical gates in the light conducting paths, said paths and gates forming the optical circuits;
    signal means for generating a signal laser beam at a frequency $f_S$;
    clocking means for generating a system clock signal;
    means responsive to said clocking means for modulating said signal laser beam to produce a data laser pulse synchronized with the system clock;
    laser means for generating a laser beam at a pumping frequency $f_P$;
    said laser means responsive to said clocking means for switching the pump laser beam ON/OFF as a function of the system clock signal and thereby generating a pump laser pulse;
    light amplifying means in addition to said logical gates, said amplifying means spatially distributed in said circuit paths and responsive to pump laser pulses for amplifying the data laser pulses in the optical circuits;
    spatial distribution means for distributing said pump laser pulses on a pump light path to said light amplifying means and for preventing said pump laser pulses from entering said circuit paths and said logical gates, said pump light path to each amplifying means having a length that defines the pump pulse arrival time at said light amplifying means; and said optical circuits having an optical path length to said light amplifying means such that data pulses in sync with the system clock arrive at said light amplifying means in sync with pump pulses and are amplified while data pulses arriving at said light amplifying means out of sync with pump pulses are not amplified.

13. The apparatus of claim 12 and wherein, portions of data pulses in sync with the pump pulses are increased in strength by said light amplifying means, and in addition:

means for attenuating data pulses in the optical circuit paths whereby portions of the data pulses out of sync with pump pulses at the light amplifying means are decreased in strength and the data pulses are thereby reshaped and resynchronized.

14. The apparatus of claim 12 wherein:

a plurality of said light amplifying means with each amplifying means being spatially located along the optical circuit paths so that the distance between light amplifying means is such that in sync data pulses will arrive at each light amplifying means in sync with the pump pulses.

15. The apparatus of claim 14 wherein said spatial distribution means comprises:

means for spreading the pump laser pulses into a collimated beam wide enough to illuminate the entire optical means for masking the optical chip to prevent the pump laser beam from illuminating the chip except where each light amplifying means is located.

16. The apparatus of claim 14 wherein said spatial distribution means comprises:

a holographic means for directing the pump laser pulses to each light amplifying means location in the optical chip.

17. The apparatus of claim 14 wherein said spatial distribution means comprises:

light conducting means for conducting the pump laser pulses to each light amplifying means location in the optical chip.

18. The apparatus of claim 12 wherein said spatial distribution means comprises:

an illumination chip having a layer containing light conducting paths for the pump pulses;

said pump pulse paths travelling through the illumination chip to a light emission point, the spatial distribution of the emission points being substantially the same as the spatial distribution of said light amplifying means; and said illumination chip being mounted relative to said optical chip whereby the emission points are juxtaposed with said light amplifying means.

19. The apparatus of claim 12 wherein said spatial distribution means comprises:

second light conducting paths in said optical chip for conducting pump pulses to said light amplifying means.

20. The apparatus of claim 19 wherein:

said optical chip has a substrate, a first layer containing light conducting paths for the optical circuits and a second layer containing said second light conducting paths for the pump pulses; and said second light conducting paths travelling through said second layer to light emission points, the spatial distribution of the emission points being substantially the same as the spatial distribution of said light amplifying means.

* * * * *